United States Patent [19]

Sorensen

[11] Patent Number: 4,754,206
[45] Date of Patent: Jun. 28, 1988

[54] SHUTDOWN CIRCUIT FOR CRT HIGH VOLTAGE SYSTEM

[75] Inventor: Tom L. Sorensen, Berwyn, Ill.

[73] Assignee: Zenith Electronics Corporation, Glenview, Ill.

[21] Appl. No.: 900,653

[22] Filed: Aug. 26, 1986

[51] Int. Cl.⁴ ............................................. H01J 29/70
[52] U.S. Cl. .................................... 315/411; 358/243
[58] Field of Search ......................... 315/411; 358/243

[56] References Cited

U.S. PATENT DOCUMENTS

| | | | |
|---|---|---|---|
| 4,058,754 | 11/1977 | Ohnishi et al. | 315/411 |
| 4,074,323 | 2/1978 | Griffey | 315/411 |
| 4,185,234 | 1/1980 | Baker | 315/411 |
| 4,234,829 | 11/1980 | Willis | 315/411 |

Primary Examiner—Theodore M. Blum
Assistant Examiner—David Cain

[57] ABSTRACT

A shutdown circuit for a CRT deflection and high voltage system includes a magnetic core having a one turn sensing coil in series with the emitter-collector of the horizontal output transistor that supplies the CRT deflection means and high voltage generator. A one turn pickup coil is also coupled to the magnetic core and develops a signal responsive to the load current in said transistor. The signal is rectified and supplied to the base-emitter junction of a switch transistor having its emitter-collector path connected between the junction of the power supply fuse and a B+ voltage terminal and ground. In the event of a fault in the load supplied by the horizontal output transistor, the switch transistor is driven conductive to place a short circuit across the B+ voltage terminal to rapidly blow the fuse.

8 Claims, 1 Drawing Sheet

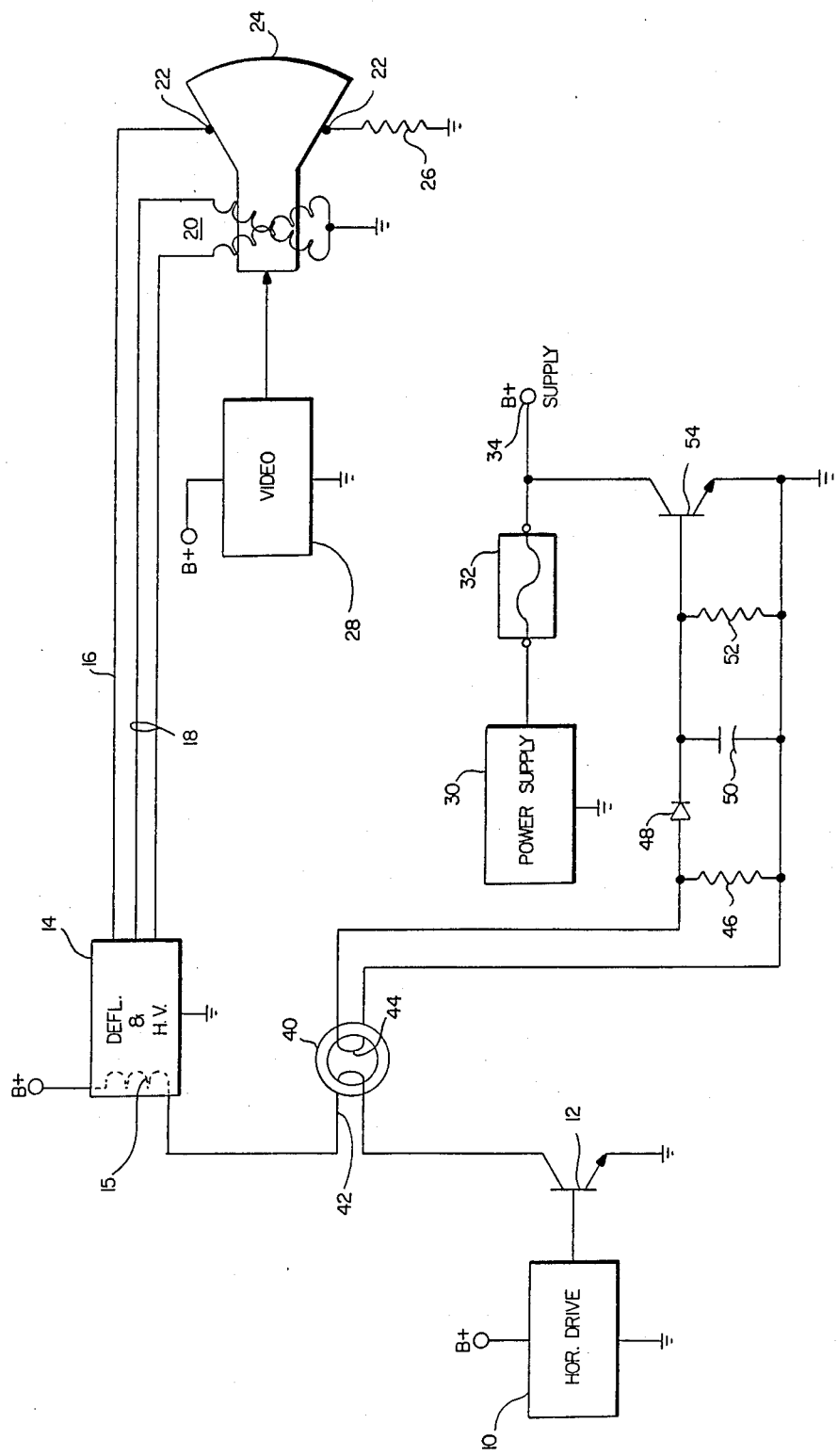

SHUTDOWN CIRCUIT FOR CRT HIGH VOLTAGE SYSTEM

BACKGROUND OF THE INVENTION AND PRIOR ART

This invention relates generally to cathode ray tube (CRT) deflection and high voltage circuits and particularly to a shutdown circuit arrangement for rapidly disabling a deflection and high voltage system in the event of a fault condition.

CRT display systems are well known in the art. In transistorized display systems, a horizontal drive supplies a sawtooth shaped current at the deflection frequency to a horizontal output transistor that supplies a load circuit consisting of a deflection transformer. The deflection transformer develops the required horizontal deflection signals which are applied, along with suitable vertical deflection signals, to a yoke structure that is located on the neck of the CRT. These signals control the deflection or scanning of the electron beam produced in the CRT to develop a so-called raster. The horizontal deflection system includes a high voltage winding for developing a high voltage that is rectified and applied to suitable internal electrodes in the CRT for its operation. A source of video information provides the necessary modulating potentials for the CRT electron beam. In some deflection systems, a high voltage "bleed" resistor is used to stabilize the high voltage applied to the CRT.

Many foreign countries have adopted the so-called TUV standard. This standard includes, among its provisions, a specification that the deflection system be disabled in the event of a fault in the bleed resistor that would result in the high voltage electrode being connected to ground. In such a situation, the deflection system must be capable of being disabled quickly enough to avoid damage to its various components.

It has been found that in deflection systems of conventional design, shorting the high voltage electrode to ground does not produce a sufficiently rapid increase in fault current to open the B+ supply fuse or circuit breaker quickly enough to preclude damage to the deflection transformer, sweep transistor or other deflection system components. Accordingly, there is a need to provide a circuit for rapidly disabling the CRT deflection system in the event of a short circuit condition occurring between the high voltage electrode and ground.

OBJECTS OF THE INVENTION

A principal object of the invention is to provide an improved high voltage shutdown circuit for a CRT deflection system.

Another object of the invention is to provide a low cost, self-protected high voltage CRT system.

BRIEF DESCRIPTION OF THE DRAWING

These and other objects and advantages of the invention will be apparent upon reading the following description in conjunction with the drawing, the single figure of which is a partial schematic diagram of a shutdown circuit constructed in accordance with the invention.

DESCRIPTION OF THE PREFERRED EMBODIMENT

Referring to the single figure, a horizontal drive circuit 10, of conventional construction, is indicated in block form and is shown connected to B+ and ground terminals. Horizontal drive 10 supplies a sawtooth drive signal to the base of a horizontal output transistor 12, that has an emitter electrode connected to ground and a collector electrode coupled to a deflection and high voltage circuit 14. Specifically, the collector of output transistor 12 is connected to a B+ terminal through a winding 15 (indicated in dashed lines) in deflection circuit 14. The deflection circuit, by well-known means, develops a very high voltage operating potential and supplies it over a lead 16 to a suitable high voltage electrode 22 situated on a CRT 24. A bleed resistor 26 is connected between high voltage electrode 22 and ground and serves to stabilize the CRT high voltage. Deflection circuit 14 also provides suitable horizontal and vertical deflection signals over a pair of leads 18 to a yoke structure 20 located on the neck of CRT 24. A video source of signals 28 is shown connected to CRT 24 and, as those skilled in the art will recognize, supplies suitable modulating potentials to an electron gun structure (not shown) in CRT 24.

A power supply means is generally indicated by block 30 and develops the required B+ potential at a B+ terminal 34 for the deflection circuit. A fuse 32 is connected between power supply 30 and B+ terminal 34 for interrupting the B+ current supply in the event of a fault condition. It will be appreciated by those skilled in the art that the B+ supply at B+ terminal 34 may be used to supply not only deflection circuit 14 but other components, as shown, as well as an entire video monitor or a television receiver. The fusing characteristics of fuse 32 will thus be determined by its use. It is also contemplated that a circuit breaker or other interruption means may be employed with equal facility in place of a fuse.

A detection circuit includes a toroid 40 of ferromagnetic material, preferably ferrite, for sensing current flow in output transistor 12 by means of a single turn sensing winding 42. A single turn winding pickup coil 44 couples a signal that is indicative of the current flow in horizontal output transistor 12 to a resistor 46, having a value of approximately 1,000 ohms. The single turns used for sensing winding 42 and pickup coil 44 will be understood to be representative only and in practice a greater or lesser number of turns for either may be used as circuit requirements dictate. Any arrangement selected should disturb the horizontal output transistor and its load circuit as little as possible and yet adequately sense current flow therein to enable development of a signal of sufficient magnitude (in the event of a fault condition) to drive a switch transistor 54 into conduction.

The signal developed across resistor 46 is rectified and filtered by means of a diode 48, a capacitor 50 and a resistor 52. Resistor 52 has a value on the order of 62 ohms and stabilizes the voltage developed across capacitor 50 which may have a value of about 1.0 microfarad. The potential developed across resistor 52 is supplied to the base-emitter junction of switch transistor 54. In the presence of a significant overload current in output transistor 12, indicating a fault condition in the deflection system, the potential across resistor 52 is sufficient to drive transistor 54 into conduction. When transistor 54 is driven into conduction, it establishes a low impedance path from B+ terminal 34 to ground resulting in a large increase in current flow through fuse 32 which causes fuse 32 to "blow" very quickly. Thus, in the event of a fault in the deflection system, resulting in a large increase in emitter-collector current in output transistor 12, switch transistor 54 is driven conductive to short the power supply to ground and immediately blow fuse 32. While, as mentioned above, the particular design of the circuit will dictate the fusing requirements, the preferred embodiment uses a load current increase in output transistor 12 of approximately three to four times the normal current flow to operate switch transistor 54. With the circuit, a solid connection between the high voltage electrode 22 and ground will operate switch transistor 54 and open fuse 32 before output transistor 12, or its associated components in the deflection system, suffers any damage.

It is recognized that numerous changes and modifications in the described embodiment of the invention will be apparent to those skilled in the art without departing from its true spirit and scope. The invention is to be limited only as defined in the claims.

What is claimed is:

1. A shutdown circuit for a CRT high voltage system comprising:
   generating means including a horizontal output transistor for generating a voltage for said high voltage system;
   power supply means for supplying power to said generating means;
   interruption means coupled between said supply means and said generating means;
   detection means coupled in series with said horizontal output transistor and developing a signal indicative of a fault condition in said high voltage system characterized by an increase in current flow in said horizontal output transistor; and
   switching means coupled to said interruption means and responsive to said signal from said detection means for disconnecting said generating means from said power supply means.

2. The circuit of claim 1 wherein said generating means further includes a deflection circuit connected in series with said horizontal output transistor and wherein said detection means comprises a magnetic detection device connected in series with said deflection means and said horizontal output transistor.

3. The circuit of claim 2 wherein said switching means comprises a switch transistor having its output circuit connected between said interruption means and a source of common potential, said switch transistor being driven conductive in response to said signal from said detection means for operating said interruption means in the presence of a significant increase in said current in said horizontal output transistor.

4. The circuit of claim 3 wherein said interruption means comprises a fuse with said switch transistor having its output circuit connected to the junction of said fuse and said generating means; and wherein said magnetic detection device comprises a magnetic core having a winding for developing said signal; and means for rectifying said signal and applying it to the input of said switch transistor.

5. The circuit of claim 4 wherein said magnetic device includes a one turn sensing winding carrying said current in said horizontal output transistor and a one turn pickup winding for developing said signal.

6. In combination:
   a source of horizontal drive signal;
   a horizontal output transistor having an input coupled to said source of horizontal drive signal and supplying a load circuit;
   deflection means in said load circuit;
   a CRT high voltage and deflection system coupled to said deflection means;
   a power supply for supplying B+ voltage to said deflection means and to said horizontal output transistor and including a fuse connected from said power supply to a B+ voltage terminal;
   a switch transistor having an emitter-collector circuit connected between said fuse and said B+ voltage terminal and ground;
   detection means coupled in series with the horizontal output transistor including a magnetic core linked to sense the load current supplied by said horizontal output transistor;
   said detection means including a pickup coil coupled to said magnetic core for developing a signal indicative of the current in said load circuit and means for rectifying and applying said signal to said switch transistor, whereby in the event of a fault condition characterized by an excessive current flow in said horizontal output transistor, said switch transistor is driven conductive to cause said fuse to open.

7. The combination of claim 6 wherein said magnetic core has a sensing winding connected in series with said load circuit.

8. The combination of claim 7 wherein both said sensing winding and said pickup coil consist of one turn.

* * * * *